(12) United States Patent
Yu

(10) Patent No.: US 7,778,236 B2
(45) Date of Patent: Aug. 17, 2010

(54) METHOD AND SYSTEM FOR IMPLEMENTING TRANSPORT SERVICE OF NEXT GENERATION NETWORK

(75) Inventor: Haoze Yu, Shenzhen (CN)

(73) Assignee: Huawei Technologies, Co., Ltd., Guangdong (CN)

( * ) Notice: Subject to any disclaimer, the term of this patent is extended or adjusted under 35 U.S.C. 154(b) by 589 days.

(21) Appl. No.: 11/660,561

(22) PCT Filed: Sep. 5, 2005

(86) PCT No.: PCT/CN2005/001402
§ 371 (c)(1),
(2), (4) Date: Feb. 15, 2007

(87) PCT Pub. No.: WO2006/026913
PCT Pub. Date: Mar. 16, 2006

(65) Prior Publication Data
US 2008/0317465 A1 Dec. 25, 2008

(30) Foreign Application Priority Data
Sep. 6, 2004 (CN) .................. 2004 1 0074520

(51) Int. Cl.
*H04L 12/28* (2006.01)
*H04L 12/50* (2006.01)
*H04L 12/56* (2006.01)
*H04Q 11/00* (2006.01)

(52) U.S. Cl. ............... 370/351; 370/359; 370/360; 370/386; 370/392; 370/395.5

(58) Field of Classification Search ......... 398/44–50, 398/52, 55–59, 66–68, 70, 74, 75, 79, 98; 370/229, 230, 235, 310, 340, 351–356, 359, 370/360, 386, 392, 395.5, 395.51
See application file for complete search history.

(56) References Cited

U.S. PATENT DOCUMENTS

| | | | | |
|---|---|---|---|---|
| 6,901,048 | B1 * | 5/2005 | Wang et al. | ............. 370/228 |
| 6,950,398 | B2 * | 9/2005 | Guo et al. | ............. 370/235 |
| 2003/0005034 | A1 | 1/2003 | Amin | ............. 709/202 |

FOREIGN PATENT DOCUMENTS

| | | |
|---|---|---|
| CN | 1406043 A | 3/2003 |
| CN | 1489354 A | 4/2004 |
| CN | 1523834 A | 8/2004 |
| KR | 10-2004-0001203 | 1/2004 |
| WO | 02/37730 A2 | 5/2002 |

OTHER PUBLICATIONS

"Alcatel: ATM in the next generation network-ATM-MLPS mediation," Alcatel Technical White Paper (Aug. 31, 2001).

(Continued)

*Primary Examiner*—Ayaz R Sheikh
*Assistant Examiner*—Blanche Wong
(74) *Attorney, Agent, or Firm*—Ladas & Parry, LLP

(57) ABSTRACT

A method for implementing transport layer service of NGN, wherein the NGN includes a service layer and a transport layer, the method including: establishing an independent transport-layer control device in the control plane of the transport layer in the NGN network; establishing a transport connection in the user plane of the transport layer under the control of the transport-layer control device; bearing the NGN service through the transport connection. The present invention also discloses a system for implementing transport layer service of NGN. According to the present invention, the network design of NGN may be simplified, the cost of the transport layer network may be reduced, and a strict QoS guarantee for NGN services may be provided.

16 Claims, 7 Drawing Sheets

OTHER PUBLICATIONS

"Architecture for the Automatic Switched Optical Networks," ITU-T Standard in Force (I) International Telecommunication Union (Nov. 29, 2001), Scanned as two docs.

Lam, H.K, "Management and Control for NGN," Telecommunication Standardization Sector, (Jun. 23, 2004).

Lehr, G., et al., "Design of a network level management information model for automatically switched transport networks," IEEE/IFIP Network Operations and Management Symposium (Apr. 15, 2004).

IP Optical Network Designing, Q in Zhibin (2002), Dec. 2002.

Optical Communication Technology, vol. 26, No. 2, Contacted Applicant for date.

Yoo, S., "Optical-Label switching, MPLS, MPLAMDAS, and GMPLS," Optical Networks vol. 4, No. 3, pp. 17-31 (May 2003).

* cited by examiner

METHOD AND SYSTEM FOR IMPLEMENTING TRANSPORT SERVICE OF NEXT GENERATION NETWORK

CROSS-REFERENCE TO RELATED APPLICATIONS

This application is the U.S. National Stage of International Patent Application No. PCT/CN2005/001402, filed on Sep. 5, 2005, which claims priority to Chinese Patent Application No. 200410074520.3, filed on Sep. 6, 2004, the disclosures of which is incorporated herein by reference.

FIELD OF THE INVENTION

The present invention relates to network communication technology field, and particularly to a method and a system for implementing transport layer service of NGN.

BACKGROUND OF THE INVENTION

With large-scale application of Internet Protocol (IP) technology and IP networks in telecommunication field, telecommunication services are packetized gradually, such that more value-added services, especially multimedia services, may be provided over packet-based IP networks. At present, IP networks mainly bear Internet services which are best-effort services without strict demand on the Quality of Service (QoS).

The emergence of Next Generation Network (NGN) services puts forward a great challenge to the conventional best-effort Internet networks and technologies. Nowadays, NGN is a focus concerned and discussed by communication enterprises. People wish to provide solutions for issues in various networks such as network convergence, forward/backward-compatible smooth evolution, establishment of profitable business modes for adding Average Revenue Per User (ARPU), Average Profit Per User (APPU) and efficient multi-service added values by means of NGN. Conventional Internet networks and technologies may not provide telecom-level NGN services. More and more telecom organizations and operators believe that NGN should absorb the technologies of Internet, discard the idea of Internet, and refer more to the idea of Public Switched Telephone Network (PSTN) instead. The problems existing in NGN at present are mainly focused on QoS, security, protection, and signaling system, etc. The Service control plane of NGN is most frequently and maturely researched in NGN, and the practice of NGN has shown that the transport service of NGN has become one of the largest technological barriers to the development of NGN.

At present, International Telecommunications Union (ITU-T) divides NGN into a service layer and a transport layer, and each layer may be divided into a user plane, a control plane and a management plane. From the view of the practical network construction of NGN, the service layer of NGN includes various Application Layer devices, and the transport layer is generally composed of IP Routers and Ethernet Switchers, Asynchronous Transfer Mode (ATM), private-line direct interconnection and physical transport layer network; From the view of protocol hierarchy, the transport layer of NGN includes a physical transport sub-layer (L1) and a packet transport sub-layer (L2, L3-L7). This method shifts the processing and switching functions of IP Layer and the protocol layers above IP Layer (including L3-L7 of ISO network protocols) implemented by routers to the transport layer. With appearance of multi-service routers, more and more complicated features of NGN service layer will be implemented in routers, which will cause a confusion of the service layer and the transport layer when the NGN is physically implemented; for example, the multi-service routers in NGN implement not only many functions of the service layer but also functions of the transport layer, which is harmful to a simple, secure and low-cost construction of transport network of NGN, an finally harmful to the building of telecom-level NGN. Therefore, from the view of development, it is more reasonable to logically allocate the functions of IP Layer and the layers above IP layer (L3-L7) to the service layer of NGN, and the physical implementation of the service layer and the transport layer in NGN should be clearly separated.

The network technologies of the Physical Layer in NGN mainly include SDH technology and Optical Transport Network (OTN) technology, in which SDH technology has been very mature after many-year development. At present, the SDH technology is developed toward Multiple Service Provisioning Platform (MSPP); MSPP is a convergence of packet technology and SDH technology; besides Ethernet interface and the layer 2 (L2) switching, ATM interface and ATM switching, MSPP also begins to support Resilient Packet Ring over SDH (RPR over SDH), Multi-Protocol Label Switching over SDH (MPLS over SDH); the enhancement of data characteristics in MSPP and the standardization of technologies such as Generic Framing Protocol (GFP), Link Capacity Adjustment Scheme (LCAS) and Virtual Concatenation make SDH networks possess stronger and stronger transport capability for NGN services. OTN is a development of Wavelength-Division Multiplexing (WDM) technology, which enables a wavelength-division network to have an ability of constructing telecom-level optical transport networks; at present ITU-T has substantially completed the standardization of the main contents of OTN; OTN implements large-granularity transport with bandwidth larger than 2.5G suitable for NGN broadband services, therefore it is one of the key network technologies for Physical Layer transport of NGN in the future.

As for the control plane of the transport layer, the control plane protocols of respective sub-layers of the transport layer are isolated from each other, and there is no strict separation between the control plane and the user plane; wherein the control protocol of MPLS of the packet transport sub-layer has been relatively mature. As for the control protocol of the physical transport sub-layer, the appearance of Automatically Switched Optical Network (ASON) technology makes it possible for the physical layer network to be controlled though signaling; nowadays ASON has been applied in a broader and broader range, which adopts a signaling protocol similar to the signaling protocol of MPLS; therefore from a long-term point of view, it is possible for the control protocol of MPLS sub-layer and the control protocol of ASON to be unified.

In the prior methods for implementing NGN, several methods may be used for implementing the user plane of the transport layer in NGN as follows:

(1) separating the packet transport sub-layer and the physical transport sub-layer: implementing the service layer and the MPLS Packet transport sublayer with routers, bearing them on the physical transport sublayer devices such as Synchronous Digital Hierarchy/Wavelength-Division Multiplexer/Optical Transport Network (SDH/WDM/OTN).

(2) adopting MSPP: MSPP is a convergence of packet technology and SDH technology. At present, the MSPPs of a part of manufacturers possess MPLS function, and their implementation of MPLS may be concluded as two modes:

One mode is to implement MPLS on the User Network Interface (UNI) Board of MSPP, as shown in FIG. 1; the MPLS data flows are directly mapped into SDH Virtual Containers (SDH VCs) through the UNI Interface Board, and then transferred to the SDH High Order/Low Order (SDH HO/LO) crossing.

The other mode is to design a centralized MPLS switching module, as shown in FIG. 2; the MPLS data flows accessing through the UNI are mapped into SDH VCs, and transferred into the centralized MPLS switching module through the SDH HO/LO crossing for switching; or the MPLS data flows from the SDH UNI (borne on SDH VCs) are crossed through the SDH HO/LO, and then transferred to the centralized MPLS switching module for switching.

The above-mentioned two modes mainly aim to transport private line services; both of them may not meet the demand of large-scale and large-capacity NGN service transport.

In summary, in the prior network architectures and implementation methods of NGN, the service layer and the transport layer of NGN are confused; for example, the service routers may implement not only many functions of the service layer but also the functions of the transport layer. The lack of independence of the transport layer control plane in NGN makes it difficult to establish a secure signaling plane. The separated implementation of the transport layer functions is unfavorable to the construction of telecom-level transport network with high-efficiency and high-availability, or the reduction of the cost of transport network.

SUMMARY OF THE INVENTION

According to an embodiment of the present invention, there is provided a method for implementing transport service of NGN which includes a service layer and a transport layer, the method including:

establishing an independent transport-layer control device in the control plane of the transport layer in the NGN;

establishing a label switched path (LSP) in the user plane of the transport layer under the control of the transport-layer control device;

Transferring the NGN service through the label switched path (LSP).

Optionally, the method further includes:

dividing the user plane of the transport layer into a Multi-Protocol Label Switching (MPLS)-based packet transport sub-layer and a physical transport sub-layer; and, integrating the functions of the MPLS-based packet transport sub-layer and the physical transport sub-layer into the same device for implementation.

Optionally, the functions of the MPLS-based packet transport sub-layer and the physical transport sub-layer are implemented by a Broadband Add/Drop Multiplexer (B-ADM), and the method further includes:

for data flows from a Synchronous Digital Hierarchy (SDH) interface, abstracting Time Division Multiplex (TDM) data flows and MPLS data flows from the data flows, and performing an SDH switching and an MPLS switching respectively;

for MPLS data flows from an Ethernet interface, performing an MPLS switching;

for data flows from an Optical Transport Network (OTN) interface, performing Optical channel Data Unit (ODU) crossing, and for the MPLS data flows in the ODU, performing an MPLS switching;

multiplexing the crossed ODU from ODU switching module for uplink transfer;

multiplexing the switched data flows from the SDH switching module for uplink transfer;

encapsulating the switched MPLS data flows into ODUs of the OTN and performing a ODU switching; or bearing the switched MPLS data flows with SDH Virtual Containers (VCs) and then performing an SDH VC crossing, or transferring the switched MPLS data flows out via an Ethernet interface.

Optionally, the functions of the MPLS-based packet transport sub-layer and the physical transport sub-layer are implemented by a packet-based Add/Drop Multiplexer (P-ADM), and the method further includes:

for MPLS data flows from an Ethernet interface, performing an MPLS switching;

for data flows from an OTN interface, performing Optical channel Data Unit (ODU) switching, and for the MPLS data flows in the ODU, performing an MPLS switching transferring the switched MPLS data flows out via an Ethernet interface, or multiplexing the switched MPLS data flows into ODUs and performing a ODU switching;

multiplexing the switched ODU from ODU switching module for uplink transfer.

Optionally, the step of establishing a transportation connection in a user plane of the transport layer under the control of the transport-layer control device includes:

obtaining by the transport-layer control device a label switched path (LSP) establishment request;

calculating the routing and the bandwidth allocation for the label switched path (LSP);

establishing the label switched path (LSP) in the user plane of the transport layer according to the calculation results.

More particularly, the label switched path (LSP) establishment request may be driven by pre-planning. Or, the label switched path (LSP) establishment request may be driven by service layer.

Optionally, the establishing the label switched path (LSP) in the user plane of the transport layer according to the calculation results is implemented according to the following steps:

obtaining the physical path which is required for establishing the label switched path (LSP) in the user plane of the transport layer according to the calculation results;

allocating the bandwidth for the label switched path (LSP) on the physical path according to the QoS parameters of the label switched path (LSP);

establishing the label switched path through Generalized Multi-Protocol Label Switching (GMPLS) signaling.

Optionally, the step of obtaining the physical path includes:

if the physical path has already existed and the bandwidth is adequate, obtaining the physical path;

if the physical path has already existed and the bandwidth is inadequate, adjusting the bandwidth of the physical path in a predetermined mode, and then obtaining the adjusted physical path;

if the physical path does not exist and the NGN network permits the physical path to be automatically established, establishing the physical path through the GMPLS signaling.

Optionally, the predetermined method includes: GMPLS signaling and Link Capacity Adjustment Scheme (LCAS).

Optionally, the step of establishing the physical path through the GMPLS signaling also includes: if the established physical path needs to be protected, calculating and establishing the corresponding protection routing according to the required protection level.

Optionally, the step of establishing the label switched path through Generalized Multi-Protocol Label Switching (GMPLS) signaling also includes: establishing the corresponding protection label switched path according to a protection type.

Optionally, the step of Transferring the NGN service through the label switched path also includes:

transferring the information of the label switched path and the corresponding protection label switched path to a service-layer control device.

Optionally, the method also includes:

when a fault occurs on the working label switched path, switching the working label switched path to the protection label switched path under the control of the transport-layer control device, and transferring the switching result to the service-layer control device;

managing the bandwidth resource and the QoS of the label switched path (LSP) through the transport-layer control device.

Optionally, the method also includes: establishing a service layer connection in the user plane of the service layer in NGN through service layer control device.

According to another embodiment of the present invention, there is provided a system for implementing the transport service of NGN, the system including: a user plane, a control plane, and a management plane, wherein the user plane includes: a packet transport sub-layer and a physical transport sub-layer;

the packet transport sub-layer includes a Multi-Protocol Label Switch (MPLS) device, and configured to establish a Label Switched Path (LSP) and implementing a packet based switching functionality;

the physical transport sub-layer is a network entity composed of Synchronous Digital Hierarchy (SDH) devices and/or Optical Transport Network (OTN) devices, and configured to establish a physical path;

the control plane includes a transport-layer controller, and configured to control the Multi-Protocol Label Switch device of the packet transport sub-layer to establish an LSP and configured the physical device of the physical transport sub-layer to establish a physical routing, and to monitor them by the management plane;

the management plane is composed of management layer devices, and configured to interact with the transport layer controller, controlling the transport layer controller to establish the label switched path (LSP) and physical link.

Optionally, the transport layer network is isolated from the user plane of the service layer network.

Optionally, the packet transport sub-layer further includes a Resilient Packet Ring (RPR) and/or a Multi-Protocol Label Switching (MPLS) Ring to bear the packet service.

It could be seen from the technical solutions provided by the present invention that, based on the NGN network architecture recommended by ITU-T, the embodiments of the present invention clearly separate the user plane of the NGN service layer and the NGN transport layer, and further divide the NGN transport layer into a packet transport sub-layer and a physical transport layer; in this way, the relationship between the NGN service layer and the NGN transport layer is definite and the hierarchy of the NGN network is clearer; moreover, the clear partition of the service layer and the transport layer provides a reliable base for constructing a stable and reliable NGN transport layer network, reducing the cost of the transport network, allowing the NGN transport network to support multiple services simultaneously and for the uniform access of users, and accordingly promotes the development and the maturity of the NGN transport network.

Based on subdividing the NGN network architecture according the embodiments of the present invention, the physical implementation of Integrated Service Switching Point (ISSP) (a service layer device) with complicated service functions and the relatively simple physical implementation of the transport layer demanding very high reliability may be separated; and the control function of the transport layer may be isolated from the transport-layer physical devices, by which a secure and reliable signaling plane of the NGN transport layer may be easily constructed; through adding abilities of transport layer bandwidth resource management and interaction with service layer controllers, the embodiments of the present invention also allows the establishment of the transport layer connection to be driven by planning or to be dynamically driven by services, thus enhancing the network intelligence and providing the abilities of bandwidth management and QoS management.

DETAILED DESCRIPTION OF THE PREFERRED EMBODIMENTS

Firstly, the abbreviations used in the specification are explained as following:

NGN Next Generation Network
IMS IP Multimedia Subsystem defined by 3GPP
ASON Automatically Switched Optical Network defined by ITU-T
OXC Optical Cross-Connect
OTN Optical Transport Network
ODU Optical channel Data Unit
ODU1/2 two kinds of Optical channel Data Units, 2.5G/10G
OCH Optical Channel
SDH Synchronous Digital Hierarchy
SDH VC SDH Virtual Container
VC12 a kind of SDH Virtual Container
VC3 a kind of SDH Virtual Container
VC4 a kind of SDH Virtual Container
STM-X SDH interface type, X refers to 1, 4, 16, 64
MSPP SDH-based Multiple Service Provisioning Platform
SONET Synchronous Optical NETwork
OC-X SONET interface type, X refers to 3, 12, 48, 192
PDH Plesiochronous Digital Hierarchy E1/E2/E3 PDH interface types
RPR Resilient Packet Ring
VPN Virtual Private Network
TDM Time Division Multiplex
ATM Asynchronous Transfer Mode
Ethernet Ethernet
TNE Transport Network Element
GFP Generic Framing Procedure defined by ITU-T
LCAS Link Capacity Adjustment Scheme defined by ITU-T
H323 Multimedia Control Protocol defined by ITU-T
MPLS Multi-Protocol Label Switching
GMPLS Generalized MPLS protocol
LSP Label switched path
SIP Session Initiation Protocol in NGN
SS7 No. 7 signaling of PSTN
ROADM Reconfigurable Optical Add/Drop Multiplexer
B-ADM Broadband Add/Drop Multiplexer
P-ADM Packet-based Add/Drop Multiplexer
SCM Service-layer control device
TCM Transport-layer control device
NMS Network Management System
OAM Operation, Administration and Maintenance
UNI User-Network Interface
NNI Network-Network Interface
PWE3 Pseudo Wire defined by IETF
FR Frame Relay
FE Fast Ethernet
GE Gigabit Ethernet
10GE 10 Gigabit Ethernet
FC Fiber Channel
POS Packet-over-SDH Interface
POTS Plain Old Telephone Service
MG Media Gateway
DSLAM Digital Subscriber Line Access Multiplexer
CMTS Cable Modem Termination System The embodiments of the invention physically separate the service layer and the transport layer of the NGN based on the NGN architecture recommended by ITU-T, and divide the transport layer into a packet transport sub-layer and a physical transport sub-layer, and then implement the functions of the packet transport sub-layer and physical transport sub-layer through the same physical device.

In addition, an independent transport layer control device is adopted to uniformly control the establishment of connections of the packet transport sub-layer and physical transport sub-layer, as well as transport bandwidth resource management and QoS management.

To make those skilled in the art better understand the solution of the present invention, the present invention will be described in detail hereinafter with reference to embodiments and accompanying diagrams.

Figure 3:
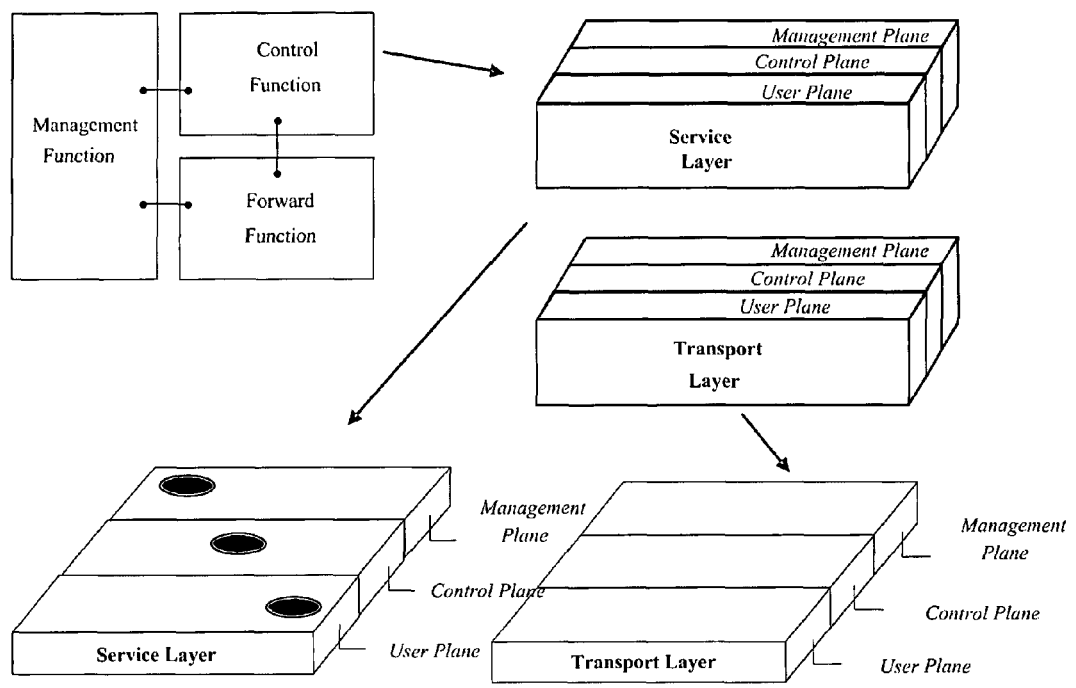
FIG. 3 is a schematic diagram illustrating the architecture of NGN network recommended by ITU-T.

The integral architecture of NGN presented by ITU-T shown in FIG. 3 includes a service layer and a transport layer, and each layer is divided into three planes, that is, a user plane in charge of the bearing and switching of service flows, a control plane of the service layer, i.e. a signaling plane, for controlling the establishment of calls and connections, and a management plane in charge of management. The control plane of the NGN service layer refers to a network entity composed of a soft-switch and a service-layer resource manager. In general, the service-layer resource manager is in charge of the management and the allocation of bandwidth resource as well as QoS strategy management of a session in the service layer to guarantee an end-to-end QoS of service layer.

The embodiments of the present invention subdivide the NGN network hierarchy based on the integral architecture of the NGN recommended by ITU-T, physically separating the service layer and the transport layer, especially physically separating the user plane of the NGN service layer and the user plane of the NGN transport layer, and further dividing the NGN transport layer into a packet transport sub-layer and a physical transport sub-layer.

Figure 4:
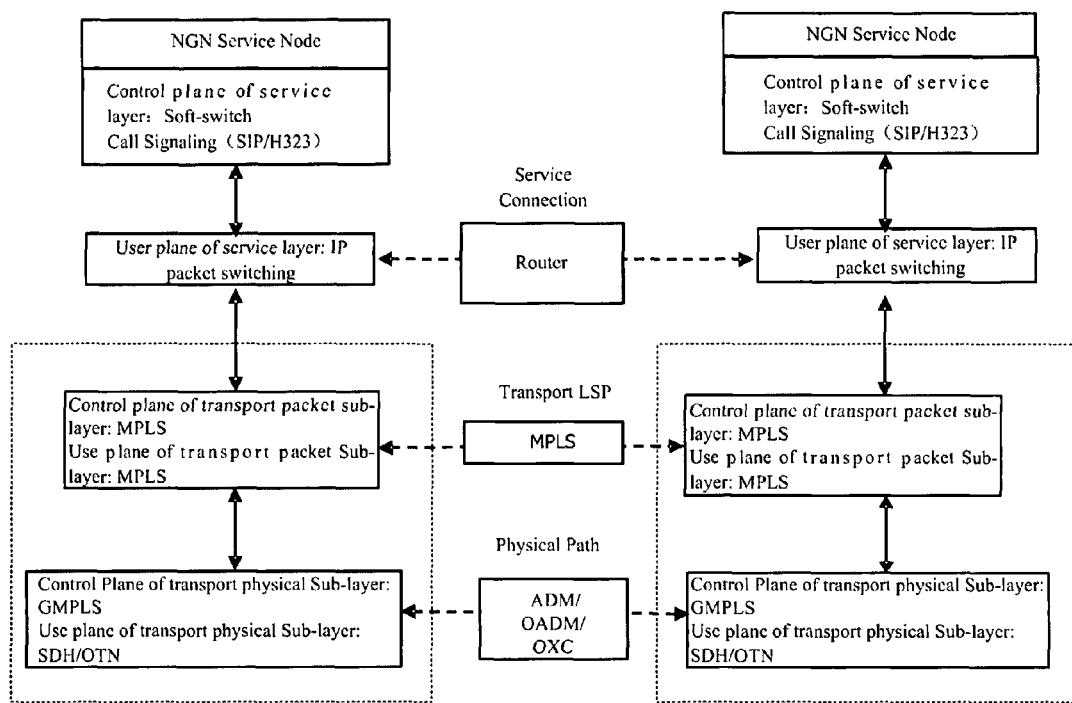
FIG. 4 is a schematic diagram illustrating the structure of the NGN transport network according to an embodiment of the present invention.

FIG. 4 is a schematic diagram illustrating the structure of the NGN transport network according to an embodiment of the present invention, in which the NGN network hierarchy is further divided as follows:

(1) The User Plane of the NGN Service Layer

The user plane of the NGN service layer is configured to implement the establishment and the switching of the connections (service flows) of the service layer. In NGN, this plane may be embodied as IP packet switching, and it is generally implemented with IP routers; this plane implements switching functions of the service layer for session services or other VPN services over NGN by packet-by-packet switching of IP packets. Besides processing the switching of the service flows, the user plane of the service layer also implement other additional high-level processing functions related to the service layer, such as IP address translation, firewall, interception, flow filtering, access authentication and so on.

(2) The User Plane of the NGN Transport Layer (Composed of Network Elements of the Transport Layer, TNEs)

The user plane of the NGN transport layer is configured to implement the establishment and the switching of transport connections between the NGN service devices. In the NGN, the transport connections between the service devices are not connections that are statically established with fixed bandwidth, but connections that may be dynamically established with flexible bandwidths and different QoS properties from each other, which may be embodied as MPLS links (LSPs). In the NGN, the transport connections have to be cooperatively provided by a packet transport sub-layer and a physical transport sub-layer due to its packet-based characteristic. Therefore, in the embodiments of the present invention the user plane of the NGN transport layer is subdivided into two sub-layers as follows:

a) packet transport sub-layer, which is based on MPLS, is in charge of the establishment and the switching of MPLS LSP, and generally implemented with an MPLS Switch device; in addition, the packet transport sub-layer may include RPR or MPLS Ring.

b) physical transport sub-layer, which is based on SDH, OTN or fiber direct connection, etc., is in charge of the establishment and the switching of physical path (such as SDH VC link, ODU or wavelength link of OTN, and Ethernet link), and is generally implemented with SDH ADMs or OTN (including OXC) devices.

(3) The Control Plane of the NGN Transport Layer (Composed of Transport-Layer Control Devices TCMs)

This plane is configured to implement the control functions of the two sub-layers of the user plane of the transport layer including topology management, link resource management, routing, connection management of the Packet transport sub-layer, connection management of the Physical transport sub-layer, management and allocation of bandwidth resource, QoS strategy management, and so on. In the embodiments of the present invention, physically independent TCMs are adopted to implement the functions of NGN transport control plane which include the functions of conventional MPLS control layer and GMPLS control layer of ASON, and the functions of routing protocols, bandwidth resource management and QoS management of the transport layer; one TCM may control multiple TNEs of the NGN transport layer. TCMs in the embodiments of the present invention adopt uniform GMPLS to implement the functions of the conventional MPLS control layer.

Figure 5:
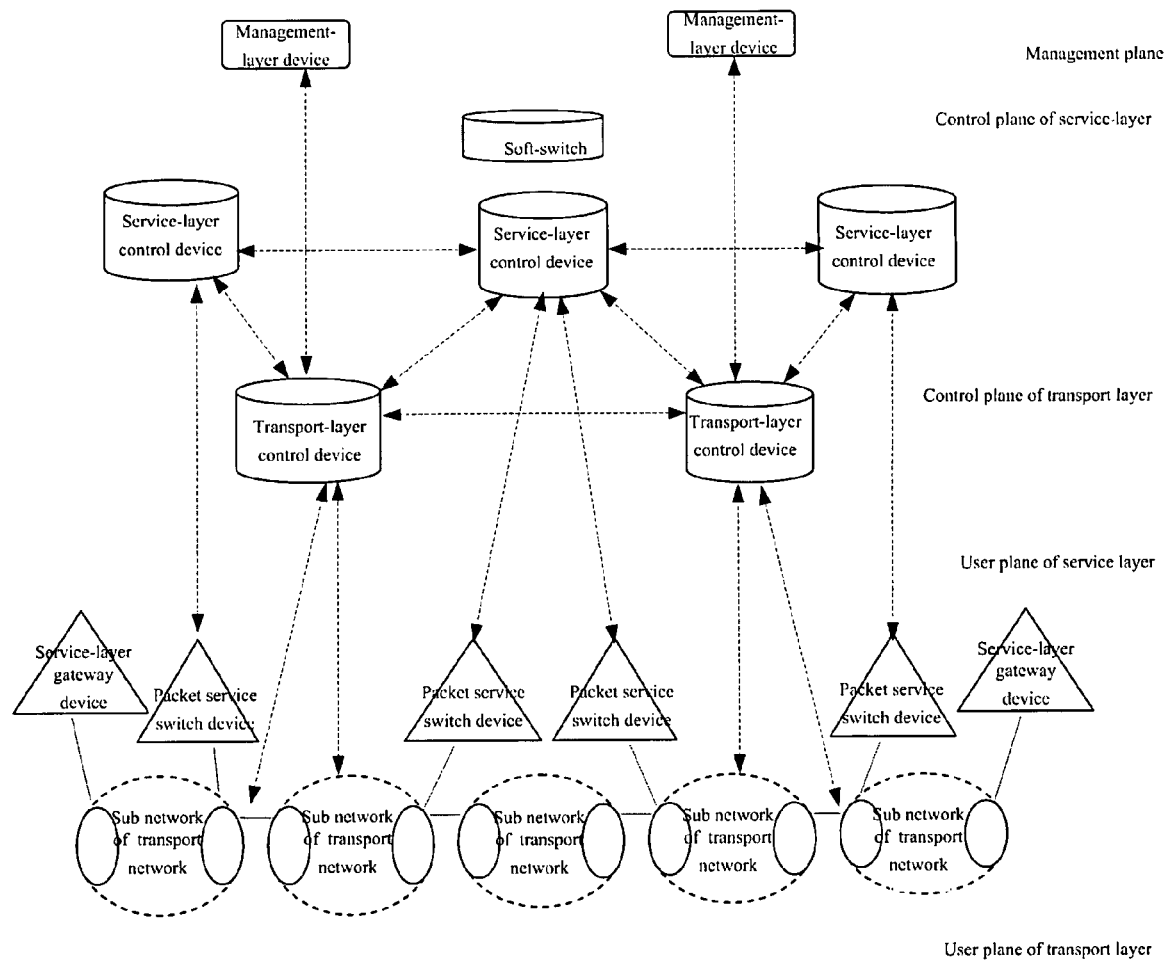
FIG. 5 is an integral model of the NGN transport network constructed according to an embodiment of the present invention.

According to the above-mentioned further dividing of different layers of the NGN, the integral model of the NGN transport network constructed according to an embodiment of the present invention is shown in FIG. 5, wherein:

the entities of the management plane are NMSs;

the entities of the control plane of the service layer are SCMs;

the entities of the control plane of the transport layer are TCMs;

the entities of the user plane of the service layer are packet service switch devices and service gateway devices; and the user plane of the transport layer is a network entity composed of transport sub networks.

Figure 6:
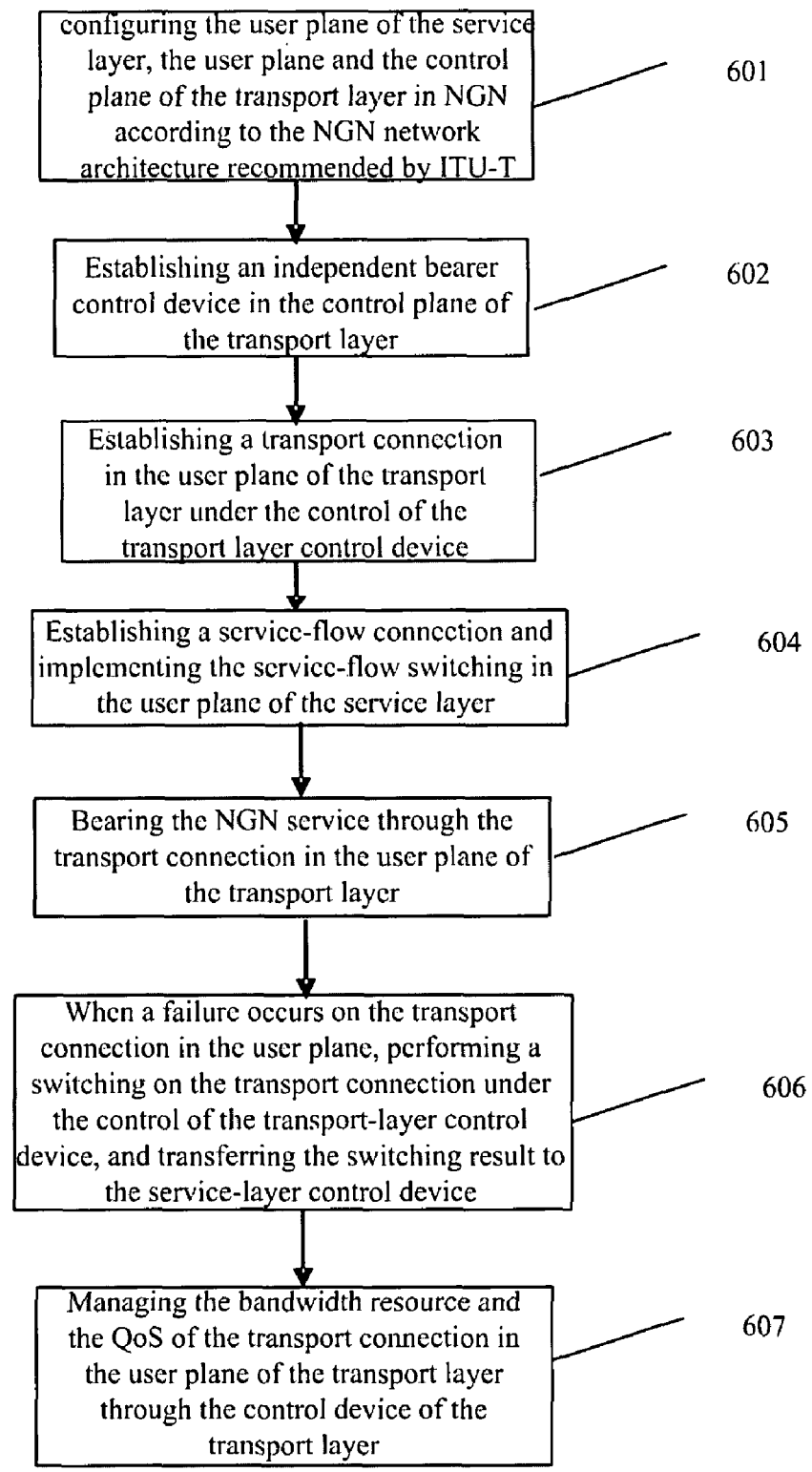
FIG. 6 is a flow chart illustrating the method according to an embodiment of the present invention.

According to the above implementation structure of the transport network, the flow of the method for implementing transport layer service of NGN according to an embodiment of the present invention is shown in FIG. 6, including the steps of:

Step 601: configuring the user plane of the NGN Service layer, the user plane and the control plane of the transport layer according to the NGN network architecture recommended by ITU-T. This step further includes dividing the user plane of the transport layer into MPLS-based packet transport sub-layer and Physical transport sub-layer, and implementing the functions of the two sub-layers by the same device, TNE.

Step 602: establishing an independent transport control device in the control plane of the transport layer, i.e. the transport layer control device adopted by the transport layer shown in FIG. 5.

Step 603: establishing a transport connection in the user plane of the transport layer by the transport layer control device.

Step 604: establishing a connection for NGN service flow in the user plane of the NGN service layer and implementing the service-flow switching.

Step 605: bearing the NGN service through the transport connection in the user plane of the transport layer.

Step 606: when a failure occurs on the working transport connection in the user plane of the transport layer, switching the working transport connection to the protection transport connection under control of the transport-layer control device, and transferring the result of the switchover to the service-layer control device.

The TNE monitors the performance of the transport connection continuously by means of SDH OAM, OTN AOM and MPLS OAM mechanisms. The TNE implements a switchover at the transport layer in case that a failure occurs, and implements a recovery rollback of the transport connection in case that the failure is recovered. The switching may or may not affect the service layer depending on the different protection types of the transport connections; the SCM is informed via the interface between the TCM and the SCM when the switchover affects the service layer.

When performing LSP merging, switching and encapsulation, the TNE makes an LSP-based scheduling, shaping and policing, so that the QoS of a data flow may not be deteriorated.

Step 607: Managing the bandwidth resource and the QoS of the transport connections by the transport-layer control device.

Figure 7:
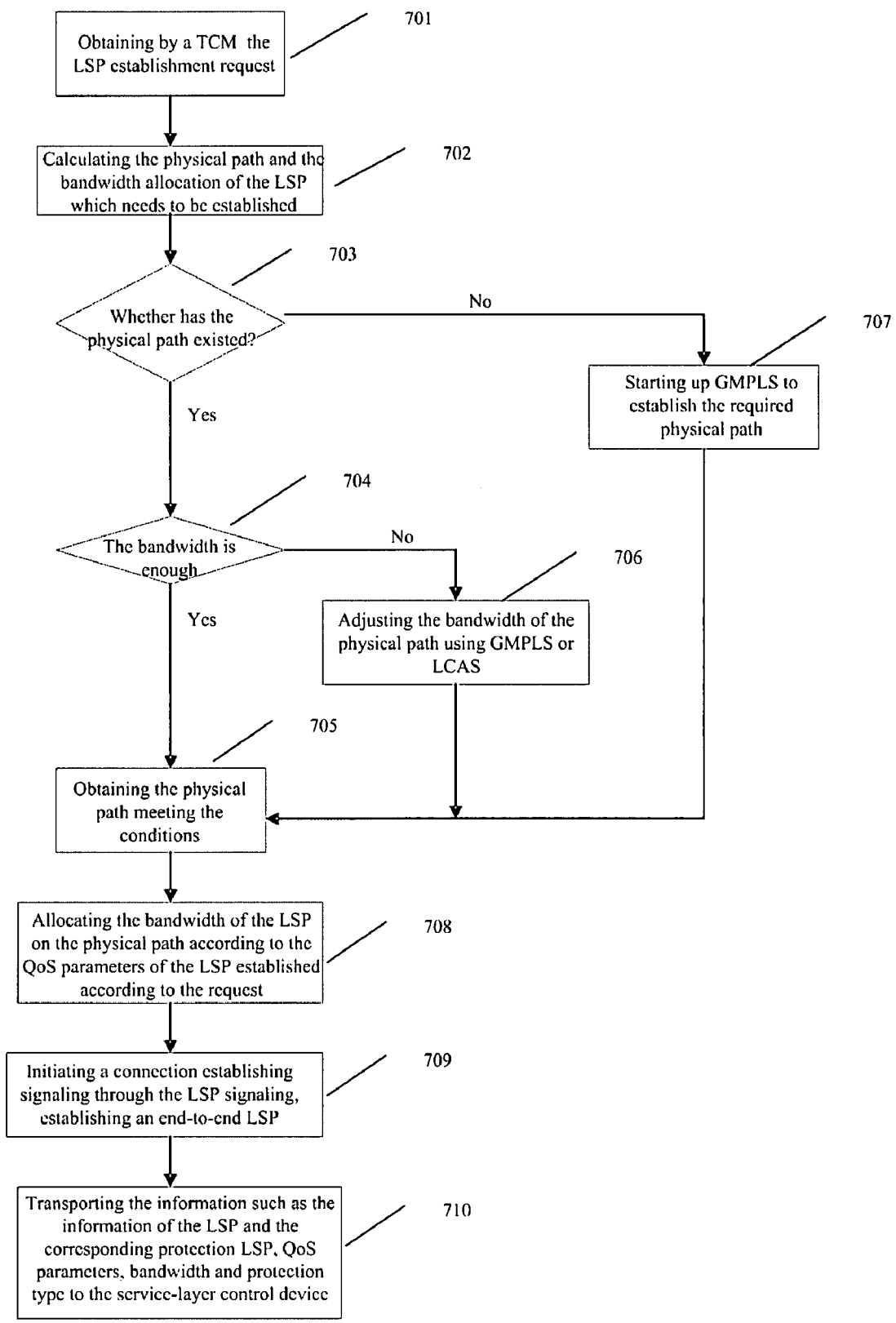
FIG. 7 is a flow chart illustrating the establishment of the transport layer connection under the control of transport layer control device in the method according to an embodiment of the present invention.

FIG. 7 illustrates the above-mentioned process of establishing a Label Switched Path (LSP) of the transport layer by the transport layer control device:

Step 701: the transport layer control device TCM obtaining a Label Switched Path establishment request. The establishment of the label switched path may be planned in advance and driven by the plan (through Network Management System, NMS), or driven by the practical service (through interaction with SCM).

After the transport layer control device receives the label switched path establishment request from the NMS or the SCM, the procedure proceeds to Step 702: calculating the physical path and the bandwidth of the label switched path.

The result of the calculation may have the following different circumstances:

(1) the physical path of the label switched path which needs to be established has existed and the bandwidth is adequate;

(2) the physical path of the label switched path which needs to be established has existed but the bandwidth is not inadequate;

(3) the physical path of the label switched path which needs to be established does not exist.

Different processes are required to be implemented for these different circumstances respectively.

The procedure proceeds to Step 703: determining whether the physical path has already exited.

If the calculated physical path has existed, for example, the physical path has been established or the physical path does not need to be established (e.g. an RPR Shared Packet Ring or a direct fiber connection), the procedure proceeds to Step 704: further determining whether the bandwidth of the physical path is adequate.

If the bandwidth is adequate, the procedure proceeds to Step 705: obtaining a physical path meeting the conditions.

If the bandwidth is inadequate, the procedure proceeds to Step 706: adjusting the bandwidth of the physical path via GMPLS or LCAS. Adjusting the bandwidth using GMPLS signaling is adaptable for all the physical-layer technologies; adjusting the bandwidth using LCAS may be applied to the physical-layer technologies of SDH and OTN, with the physical layer link adopting Virtual Concatenation (Virtual Concatenation of SDH VC and that of OTN ODU).

If the adjustment is not successful, a failure message is returned to the transport layer control device.

When the bandwidth of the physical path is adjusted, it proceeds to Step 705: obtaining the physical path which meets the conditions after the adjustment.

If the calculated physical path has not yet existed, it proceeds to Step 707: if the network allows an automatic establishment of a physical path, initiating GMPLS to establish a required physical path; and if the established physical path needs to be protected, calculating and establishing a corresponding protection path according to required protection level.

In a similar way, if the network does not allow an automatic establishment of a physical path or the establishment is unsuccessful, a corresponding failure message is returned to the transport-layer control device.

After the new physical path is established, it proceeds to Step 705: obtaining the established physical path.

The physical path for establishing a label switched path is obtained through the above-mentioned steps. In this way, the required label switched path may be established over the physical path.

And then, the procedure proceeds to Step 708: allocating bandwidth to the requested label switched path to be established over the physical path according to the QoS parameters of the label switched path.

Then it proceeds to Step 709: initiating a connection establishment via the GMPLS signaling to establish an end-to-end label switched path. In a similar way, if the label switched path needs a protection LSP, calculating and establishing the corresponding protection LSP according to the protection requirements.

After the LSP is successfully established, it proceeds to Step 710: transferring the information of the LSP and the corresponding protection LSP, the QoS parameters, the bandwidth and the protection type, etc., to a corresponding service-layer control device, such that the service-layer control device may establish a service-layer connection and allocate service-layer bandwidth.

According to the embodiments of the present invention, TCM in the control plane of the transport layer cooperates with SCM in the control plane of the service layer to implement the monitoring and the management of the LSP in the user plane of the transport layer to guarantee the QoS of NGN services.

In an embodiment of the present invention, the interface between the TCM and the SCM is utilized to implement the following service process:

(1) after establishing the LSP (which may be driven by pre-planning or by service), the TCM transferring the information such as the path of the LSP, QoS, bandwidth and protection type to the SCM through the TCM-SCM interface, and the SCM implementing service layer connection establishment and bandwidth resource allocation;

(2) if the bandwidth resource to be allocated by the SCM is inadequate, the SCM requesting the TCM to adjust the bandwidth of the LSP through the TCM-SCM interface;

(3) the TCM monitoring the LSP of the transport layer through the TNE and informing the SCM the monitoring result through the TCM-SCM interface;

(4) the SCM requesting the TCM to reestablish or switchover the LSP through the TCM-SCM interface according to the strategy of the service layer.

In the embodiments of the present invention, the user plane of the transport layer is further divided into MPLS-based packet transport sub-layer and physical transport sub-layer. Moreover, to save the interfaces between the two sub-layers, and accordingly to save the cost, reduce the maintenance workload and simplify the network design, the two sub-layers are organically implemented in the same physical device, i.e. TNE, in the embodiments of the present invention.

There are two implementation ways detailed as follows:

(1) B-ADM (Broadband Add/Drop Multiplexer)

This way mainly aims at the case that the operators have large numbers of SDH networks or large numbers of TDM services. In such cases, SDH serves as physical layer, and in the implementation of the B-ADM: either the SDH VC or the ODU of OTN may be used to for the physical-layer transport of the NGN services; in general, it is preferred for the access layer to adopt SDH VC, because the bandwidth granularity is relatively small and thus adopting SDH VC for bearing the services is more economical; while the bandwidth granularity above the aggregation layer is relatively large, adopting ODU to bear the services is more efficient. Since the MPLS services may be born over either SDH or ODU, the SDH and ODU need to be capable of interworking each other; a typical application of the interworking is: when adopting SDH to bear the MPLS service flows below the aggregation layer and adopting ODU to bear the MPLS service flows above the aggregation layer, the interworking function may be used for converting the MPLS service flows below the convergence layer born over SDH to the MPLS service flows born over ODU.

Figure 8:
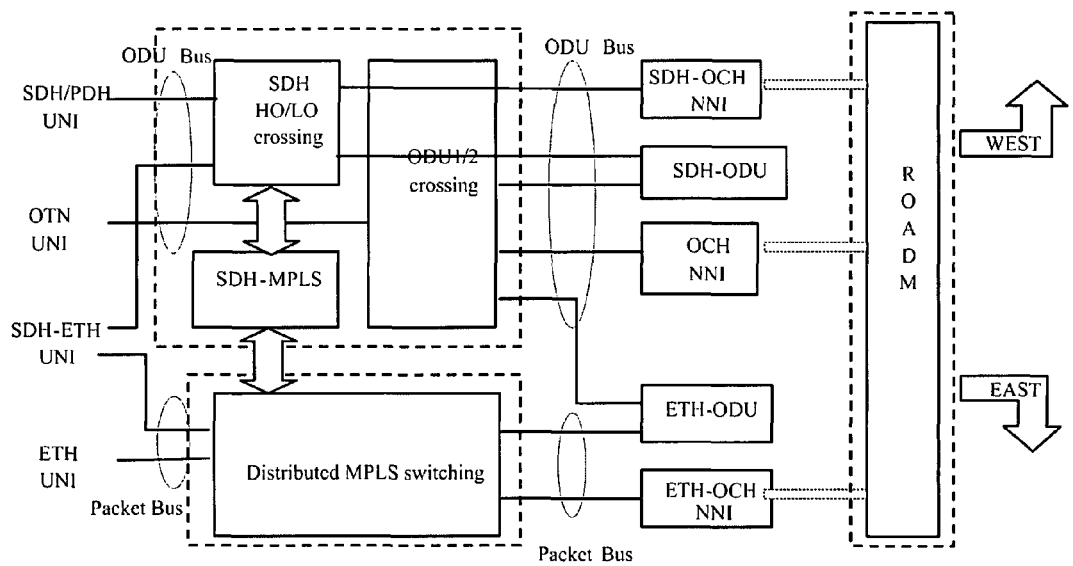
FIG. 8 is a schematic diagram illustrating the architecture of the broadband Add/Drop Multiplexer (B-ADM) for implementing the user plane of the NGN transport network according to an embodiment of the present invention.

FIG. 8 illustrates the architecture of the B-ADM, which includes the following processing modules:

a) SDH High-order/Low-order (HO/LO) crossing module, for implementing SDH High-order and Low-order crossing function, realizing small-granularity (a granularity of VC12, VC3 and VC4) crossing function;

b) ODU1/2 crossing module, for implementing ODU1 (2.5G) and ODU2 (10G) crossing of OTN specified by ITU-T, realizing large-granularity (a granularity of 2.5G/10G) crossing function;

c) MPLS distributed switching module: for implementing MPLS-based packet switching function;

d) SDH-MPLS module: for implementing the function of MPLS over SDH, realizing the functions of interface with the SDH crossing module, GFP mapping, LSP label switching, LSP-based scheduling and interface with the MPLS distributed switching module, and serving as an interworking module between the MPLS switching plane and the SDH crossing plane;

e) ROADM: a configurable OADM module, which may implement ring networking through the colored interfaces of WEST and EAST.

The interfaces of the B-ADM includes:

a) SDH/PDH UNI: user interfaces of SDH and PDH, including STM-X, E1, E3, DS3 etc;

b) OTN UNI: user interfaces of OTN, including transparent optical interfaces GE, 100GE, FE, FC, STM-X and OC-X;

c) SDH-OCH NNI: colored OTN NNI, only including SDH signals;

d) SDH-ODU interface: for encapsulating an SDH signal into an ODU signal and transferring the ODU signal into the ODU crossing module;

e) OCH NNI: for encapsulating an ODU signal into a colored OTN NNI interface;

f) ETN UNI: Ethernet interfaces of FE/GE/10GE;

g) ETH-ODU interface: for encapsulating an MPLS signal into an ODU signal and transferring the ODU signal into the ODU crossing module;

h) ETH-OCH NNI: for encapsulating an MPLS signal directly into a colored OTN NNI;

i) SDH-ETH UNI: for providing an external SDH interface, processing the signals of the SDH Layer and transferring the signals into the SDH HO/LO crossing module; at the same time, extracting the MPLS signals from the SDH VCs, transferring the extracted MPLS signals into the MPLS distributed switching module and the extracted TDM signals into the SDH HO/LO crossing module; the SDH-ETH UNI interface has both a bus interface with the SDH HO/LO crossing module and a bus interface with the MPLS distributed switching module.

The process for implementing the user plane of the transport layer with the device shown in FIG. 8 is as follows:

a. For SDH services, there are provided two access ways for SDH/PDH signals:

1: providing SDH user interfaces and PDH user interfaces such as E1/E3 using SDH/PDH UNI interface, transferring the SDH signals into the SDH HO/LO crossing module to implement SDH high-order and low-order crossing; after accomplishing SDH crossing on SDH VCs, crossing the SDH VCs which bear MPLS packet data flows to the SDH-MPLS module; the SDH-MPLS module extracting the MPLS packet data flows carried in the SDH VCs (by means of GFP mapping) and transferring the extracted MPLS packet data flows into the MPLS distributed switching module for MPLS flow switching.

2: providing SDH user interfaces using SDH-ETH UNI interface; the SDH-ETH UNI interface module is adaptable for the simultaneous transport of TDM services and MPLS services through the same SDH interface, for example, parts of VCs of an STM-4 interface are configured to transport MPLS data flows, and parts of VCs are configured to transport TDM services. The separation of the TDM data flows and the MPLS data flows is implemented by the SDH-ETH interface; after the separation, the TDM data flows are transferred to the SDH HO/LO crossing module through the ODU bus, and the MPLS data flows are transferred into the MPLS distributed switching module through the packet bus for MPLS switching.

For the SDH VCs which do not need further processing, there are two ways for uplink transfer:

1: after being crossed through the SDH crossing module, the SDH VCs directly enter into the SDH-OCH NNI interface module without passing through the ODU1/2 crossing module; the SDH VCs are directly multiplexed into a standard colored OTN interface by the SDH-OCH NNI interface module, and transferred to the ROADM module by means of OTN multiplexing for uplink transfer.

2: the SDH VCs are crossed into the SDH-ODU interface module through the SDH crossing module; by means of OTN multiplexing, the SDH-ODU interface module multiplexes the SDH VCs into high-speed signals through SDH, encapsulates these high-speed signals into an appropriate ODU of the OTN, and transfers the ODU to the ODU1/2 crossing module for ODU crossing; after ODU crossing, multiple ODU signals pass through the OCH NNI interface module and are multiplexed into standard colored OTN interface by means of OTN multiplexing and enter into the ROADM module for uplink transfer.

b. For the MPLS packet data flows:

The ETH UNI provides various packet data user interfaces such as FE, GE, LOGE, POS and ATM to provide access of packet data services; after accessing, the packet data services are encapsulated into MPLS data flows by the ETH UNI, and then flow into the MPLS distributed switching module for MPLS switching; in addition, the MPLS packet data flows carried in the SDH VCs also flow into the MPLS distributed switching module for MPLS switching after being processed by the SDH-MPLS module, thus achieving the interworking with the packet data flows from the ETH-UNI. There are two ways of uplink:

1: after being switched, the MPLS data flows are transferred to the ETH-OCH NNI interface module and directly multiplexed into a standard colored OTN interface, and then transferred uplink through the ROADM module.

2: after being switched, the MPLS data flows are transferred to the ETH-ODU interface module and encapsulated into an appropriate OTN ODU container, then transferred to the ODU1/2 crossing module for ODU crossing; after that the OTN ODU is transferred to the OCH NNI interface together with other ODUs and multiplexed to a standard colored OTN interface, and then transferred uplink through the ROADM module.

c. For wavelength services:

The ROADM is in charge of the local wavelength-level add/drop multiplexing function.

(2) P-ADM (Packet-Based Add/Drop Multiplexer)

This way mainly aims at the case that broadband service operators build the NGN networks and the operators have no TDM services, or aims at the case that integrated service operators expect that the TDM services may be transported over the original SDH network and the new NGN services are transported over pure packet network. In this case, the operators may implement the transport network directly using OTN as the Physical Layer instead of the SDH Physical Layer.

Figure 9:
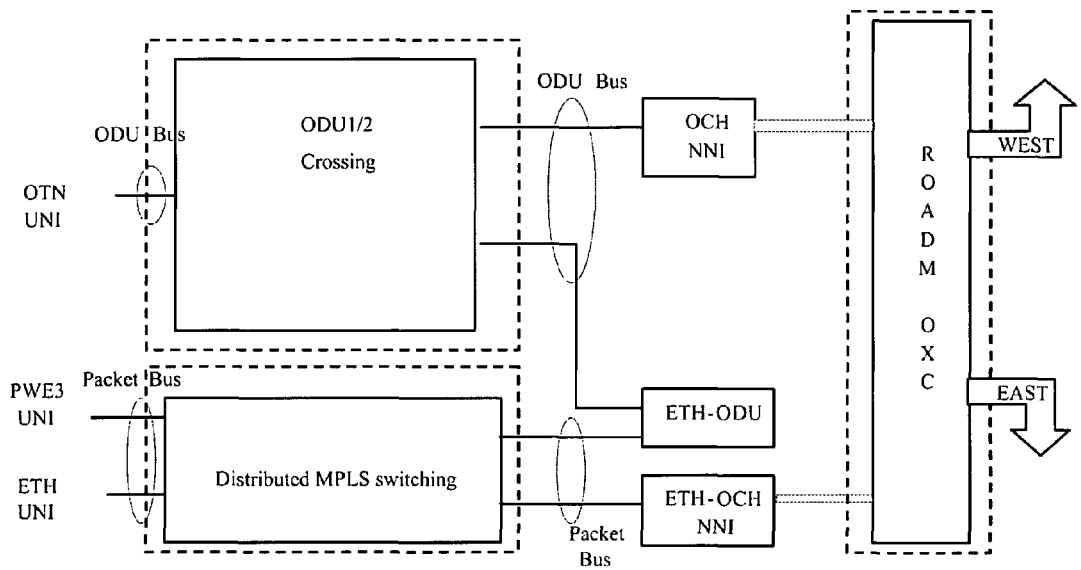
FIG. 9 is a schematic diagram illustrating the architecture of the packet-based Add/Drop Multiplexer (P-ADM) for implementing the user plane of the NGN transport network according to an embodiment of the present invention.

FIG. 9 illustrates the architecture of the P-ADM, which includes the following processing modules:

a) ODU1/2 crossing module: for implementing OTN ODU1 (2.5G) and OTN ODU2 (10G) granularity crossing function, realizing large-granularity transport and crossing between service devices;

b) MPLS distributed switching module: for implementing MPLS switching function;

c) ROADM or OXC module: for implementing ROADM or OXC function of the Optical Layer.

The interfaces of the P-ADM includes:

a) OTN UNI: OTN user interface;

b) OCH NNI: for multiplexing the ODUs from the ODU1/2 crossing module into a colored OTN NNI interface which is then transferred uplink through the ROADM/OXC;

c) ETH UNI: Ethernet user interface, which may be FE/GE/10GE;

d) ETH-ODU interface: for encapsulating the MPLS signals into ODU signals, and transferring the ODU signals to the ODU crossing module;

e) ETH-OCH NNI: for directly multiplexing and encapsulating the MPLS signals into a colored OTN NNI interface.

The process for implementing the user plane of the transport layer by the device shown in FIG. 9 is as follows:

a. For MPLS packet data flows

The ETH UNI interface provides various packet data interfaces, such as FE, GE, 10GE, POS and ATM, etc., to provide access of packet data services. After accessing, the packet data services are encapsulated into MPLS data flows through the ETH UNI interface module, and then flow into the MPLS distributed switching module for MPLS switching; there are two ways of uplink transfer:

1: after being switched, the MPLS data flows are transferred to the ETH-OCH NNI interface module and directly multiplexed to a standard colored OTN interface, and then transferred uplink through the ROADM/OXC module.

2: after being switched, the MPLS data flows are transferred to the ETH-ODU interface module and encapsulated into an appropriate OTN ODU container, and then transferred to the ODU1/2 crossing module for ODU switching; after being switched, the OTN ODU is transferred to the OCH NM interface together with other ODUs, multiplexed into a standard colored OTN interface, and then transferred uplink through the ROADM/OXC module.

b. For conventional services:

For conventional packet data services and TDM services, since the P-ADM has no TDM crossing function, the P-ADM adopts PWE3 technology to transport the conventional services. At present, IETF (an IP standardization organization) is standardizing PWE3, whose function is how to adopt a pure packet network, for example, an MPLS network to transport conventional packet data services (such as ATM, FR etc.) and TDM services (such as PDH services and SDH services). The PWE3 UNI interface module may provide ATM, FR, SDH and PDH user interfaces, and encapsulates these conventional services into MPLS format with an encapsulation format defined by PWE3, then transfers the encapsulated data to the MPLS distributed switching module to implement MPLS switching.

c. For sub-wavelength services:

Here the sub-wavelength refers to the Physical Layer connection between the service devices. The service devices may be connected through LSP or directly through a physical link. In the latter case, the P-ADM transport devices only need to implement switching on the OTN ODU layer (i.e. physical-layer switching) but does not need to implement switching on MPLS layer. These sub-wavelength services are multiplexed by the OTN UNI to appropriate ODU containers and then transferred to the ODU1/2 crossing module for switching. The OTN UNI interface module may provide various interfaces such as FE/GE/10GE/STM-X/OC-X/Fiber Channel, etc. The P-ADM provides a point-to-point transparent transport for the sub-wavelength services.

d. For wavelength services:

The OXC may be used to implement wavelength-level switching function and wavelength level connection between the service devices.

Figure 1:
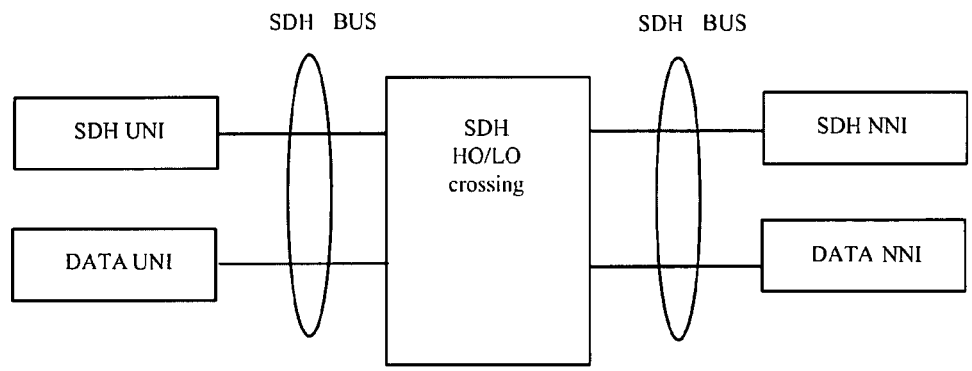
FIG. 1 is a schematic diagram illustrating one kind of structure of MSPP implementing MPLS services in the prior art.
Figure 2:
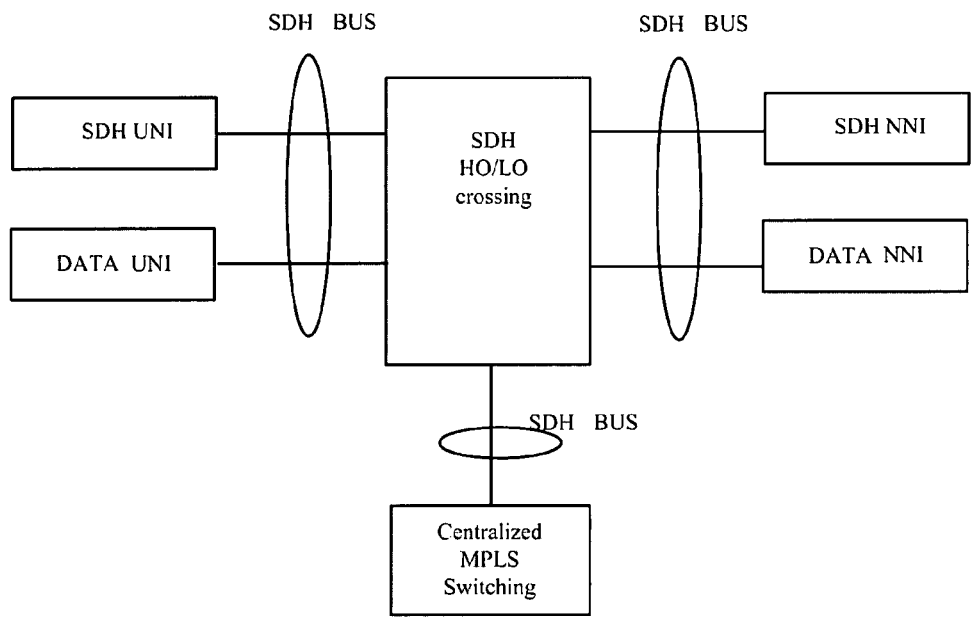
FIG. 2 is a schematic diagram illustrating another kind of structure of MSPP implementing MPLS services in the prior art.

It could be seen from the above description that, compared with the method for implementing the user plane of the NGN transport layer according to the prior art shown in FIG. 1 and FIG. 2, the first implementation way (B-ADM) has the following differences:

(1) B-ADM adopts the SDH-ETH UNI interface module to implement the separation of the TDM data flows and the MPLS data flows, that is, parts of SDH VCs of the SDH UNI interfaces (for example, STM-4 interface) bear TDM data flows and parts of the SDH VCs of SDH UNI interfaces bear MPLS data flows; in this way, the separation of TDM data flows and MPLS data flows is achieved in the SDH-ETH UNI interface module, and after being separated, the TDM data flows and the MPLS data flows are transferred to different crossing modules (SDH HO/LO crossing module and MPLS distributed switching module) respectively through different buses for switching. While in the prior art the separation of TDM data flows and MPLS data flows is implemented through the SDH crossing module.

(2) B-ADM adopts the SDH-MPLS to implement the interworking between the SDH module and the MPLS distributed switching module. The MPLS data flows may be carried in S/DH VCs; the SDH VCs bearing the MPLS data flows are switched to the SDH-MPLS module through the SDH HO/LO crossing module; the SDH-MPLS module extracts MPLS signals from the SDH VCs, then transfers the MPLS signals to the MPLS distributed switching plane through the packet bus to implement MPLS-Layer switching. While there are two implementation modes according to the prior art: one mode is that MPLS is only implemented on the data interface board of the MSPP device, the data flows (e.g. Ethernet flows) are directly mapped into SDH VCs via GFP/ITU-T X.86/PPP (Generic Framing Protocol/ITU-T X.86/Point-to-Point Protocol) on the interface board, and then transferred into the SDH crossing module directly; the other mode is that the SDH VCs bearing the MPLS data flows are crossed to the centralized MPLS switching module through the SDH crossing module to implement a centralized MPLS switching processing.

(3) The data flows (e.g. Ethernet) accessing through the ETH UNI interface module in the B-ADM may be partly transported through SDH by a method as follows: after implementing an MPLS switching on the accessing data flows (e.g. Ethernet) through the MPLS distributed switching module, transferring the resulting MPLS data flows into the SDH-MPLS module through the packet bus, mapping the MPLS data flows by the SDH-MPLS module into the SDH VCs and transferring the SDH VCs to the SDH HO/LO crossing module for SDH switching, then transferring them to SDH network or OTN network for transport.

The second implementation way (P-ADM) has the following differences:

(1) In P-ADM, the MPLS data flows outputted from the MPLS distributed switching module through the packet bus are multiplexed by the ETH-OCH NNI interface module into a colored OTN interface, transferred to the ROADM/OXC for a wavelength Add/Drop Multiplexing or wavelength switching, and then transferred to the line side. While in the prior art, the MPLS module and the ROADM/OXC are separately implemented, and the MPLS data flows are transferred to the ROAMD/OXC through a standard interface (such as Ethernet interface or POS interface) on a standard interface board (such as an Ethernet interface board or a POS interface board) of the MPLS module after being switched.

In addition, in the P-ADM and the B-ADM, the MPLS data flows outputted from the MPLS distributed switching module through packet bus are multiplexed by the ETH-ODU module into OTN ODU format, and transferred to the ODU1/2 crossing module through the ODU bus for switching; after being switched, the multiple ODUs may be multiplexed into a colored OTN optical interface through the OCH NNI interface and transferred to the line side through the ROADM/OXC. While in the prior art, the MPLS module and the ROADM/OXC are implemented separately.

The schematic diagram illustrating the networking of the system according to an embodiment of the present invention is shown in FIG. 5.

According to the NGN recommendation of ITU-T, the NGN network includes service layer and transport layer. Each layer may be divided into three planes, i.e. user plane, control plane and management plane.

the system according to the embodiments of the present invention also adopts the two layers model, each layer including three planes. Wherein, the transport layer may be divided into: packet transport sub-layer and Physical transport layer.

The packet transport sub-layer includes a Multi-Protocol Label Switch device, and used to establish an LSP and implement the switching of packet services; in addition, the packet transport sub-layer may also include an RPR and/or an MPLS Ring used for bearing the packet services.

The Physical transport sub-layer is composed of SDH devices and/or ADM devices and/or OTN devices, and used to establish a physical path for transporting the NGN services.

The control plane includes a transport layer control device, and used to control the Multi-Protocol Label Switch device of the packet transport sub-layer and control the physical devices of the physical transport sub-layer.

The management plane is composed of management-layer devices, and used to interact with the transport layer control device for transport connection establishment, i.e. the planning-based transport connection establishment is driven by the management plane.

The management plane is also in charge of configuration management, performance management, fault management, and security management of the transport layer.

In the system according to the embodiments of the present invention, the user plane of the service layer is isolated from the transport layer.

The NGN services include session-based services (e.g. voice services) and private line services, and are implemented through access devices such as MG DSLAM, Ethernet switch, PON and CMTS, etc., wherein the MG implements a POTS-based NGN service access, the DSLAM, the Ethernet switcher and the CMTS implement broadband service access; the access devices also implement coding transformation and service packetization, that is, the NGN services are transformed to IP packets through the access devices, and the NGN access devices implement the calling and the establishment of the NGN services through the signaling interaction with the controller of the service layer such as soft-switch and SCM (service-layer control device) and the signaling interaction between the service layer controllers. The NGN service switching is embodied as IP-layer switching, which is implemented by the packet service switch device shown in FIG. 5. QoS strategy dispatching and bandwidth allocation of the service layer are implemented by the interaction between the SCMs and the packet service switch device under the control of soft-switch. The packet service switch device are connected with one another through the transportation connections which are MPLS LSPs and each of which may bear multiple service calls, and the bandwidth allocation of which is implemented by the above-mentioned SCM. The transport layer is configured to implement establishment and management of the transportation connections. In general, a transportation connection is determined by network planning, which is implemented through the configuration function of the NMS (a management-plane device); the transportation connections may also be driven by service, that is, when the SCM allocates bandwidth for a Service-Layer call, if the bandwidth is found inadequate, the transport layer may also be triggered to establish or adjust the bandwidth of the transportation connections. The establishment and adjustment of the transportation connection bandwidth is implemented by protocol interaction between the NMS and the TCM (transport-layer control device) or protocol interaction between the SCM and the TCM; transportation connections of packet layer or physical layer are established between the TCMs through signaling, and then the TCMs interact with the TNEs (network elements of the transport layer) to dispatch the configurations to the TNEs, requesting the TNEs to configure the crossing network to implement the switching of the transportation connections. After the transportation connections are established, the TCMs request the TNEs to monitor them continuously and implement switchover operation when failures occurs, so as to provide protection ability in the transport layer.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A method for implementing transport layer service of Next Generation Network (NGN), the NGN comprises a service layer and a transport layer, each of which comprises a management plane, a control plane, and a user plane, wherein the method comprises:

establishing an independent transport-layer control device in the control plane of the transport layer in the NGN and an interface between the transport-layer control device and the service layer control device in the control plane of the service layer;

dividing the user plane of the transport layer into a Multi-Protocol Label Switching (MPLS)-based packet transport sub-layer and a physical transport sub-layer, wherein said MPLS-based packet transport sub-layer is for establishing a Label Switched Path (LSP) and said physical transport sub-layer is for establishing a physical path, and wherein the functions of the MPLS-based packet transport sub-layer and the physical transport sub-layer are integrated into a single device for implementation;

establishing a transportation connection in the user plane of the transport layer under the control of the transport-layer control device; and transferring NGN service through the transportation connection.

2. The method as in claim 1, wherein:

the functions of the MPLS-based packet transport sub-layer and the physical transport sub-layer are implemented by a Broadband Add/Drop Multiplexer (B-ADM), the method further comprising:

for data flows from a Synchronous Digital Hierarchy (SDH) interface, abstracting Time Division Multiplex (TDM) data flows and MPLS data flows from the data flows from the SDH interface, and performing an SDH switching and an MPLS switching on the abstracted TDM data flows and the abstracted MPLS data flows respectively;

for MPLS data flows from an Ethernet interface, performing an MPLS switching on the MPLS data flows from the Ethernet interface;

for data flows from an Optical Transport Network (OTN) interface, crossing the data flows in an Optical channel Data Unit (ODU) crossing module of OTN, and for the MPLS data flows in the data flows from the OTN interface, performing an MPLS switching;

multiplexing the data flows crossed by the ODU crossing module into OTN data flows, and transferring the OTN data flows to a OTN line side for uplink transfer;

multiplexing the SDH switched data flows into SDH data flows, and transferring the SDH data flows to a SDH line side for uplink transfer;

encapsulating the switched MPLS data flows from the SDH interface, the Ethernet interface and the OTN interface into ODUs of the OTN and performing a ODU crossing; or bearing the switched MPLS data flows with SDH Virtual Containers (VCs) and then performing an SDH crossing; or transferring the switched MPLS data flows out via an Ethernet interface.

3. The method as in claim 1, wherein:

the functions of the MPLS-based packet transport sub-layer and the physical transport sub-layer are implemented by a packet-based Add/Drop Multiplexer (P-ADM), the method comprising:

for MPLS data flows from an Ethernet interface, performing an MPLS switching on the data flows;

for data flows from an OTN interface, crossing the data flows in an ODU crossing module of the OTN, and for the MPLS data flows in the data flows, performing an MPLS switching;

transferring the switched MPLS data flows from the Ethernet interface and the OTN interface out via an Ethernet interface, or multiplexing the switched MPLS data flows into ODUs and transferring the ODUs into the ODU crossing module for switching;

multiplexing the data flows switched in the ODU crossing module to OTN data flows, and transferring the OTN data flows to a OTN line side for uplink transfer.

4. The method as in claim 1, wherein the step of establishing a transportation connection in the user plane of the transport layer under the control of the transport-layer control device comprises:

obtaining by the transport-layer control device a transport connection establishment request;

calculating a physical path and bandwidth allocation for the transport connection;

establishing the transport connection in the user plane of the transport layer according to the calculation results.

5. The method as in claim 4, further comprising: driving the transport-layer control device by pre-planning or by service layer to obtain the transport connection establishment request.

6. The method as in claim 5, wherein the establishing the transport connection in the user plane of the transport layer according to the calculation results comprises:
- obtaining the physical path which is required for establishing the transport connection in the user plane of the transport layer according to the calculation results;
- allocating the bandwidth for a label switched path (LSP) on the physical path according to QoS parameters of the label switched path;
- establishing the label switched path through Generalized Multi-Protocol Label Switching (GMPLS) signaling.

7. The method as in claim 6, wherein the step of obtaining the physical path comprises:
- if the physical path has already existed and the bandwidth is adequate, obtaining the physical path;
- if the physical path has already existed and the bandwidth is inadequate, adjusting the bandwidth of the physical path in a predetermined mode, and obtaining the adjusted physical path;
- if the physical path does not exist and the NGN network permits the physical path to be automatically established, establishing the physical path through the GMPLS signaling.

8. The method as in claim 7, wherein the predetermined mode comprises: GMPLS signaling and Link Capacity Adjustment Scheme (LCAS).

9. The method as in claim 7, wherein the step of establishing the physical path through the GMPLS signaling further comprises: if the established physical path needs to be protected, calculating and establishing a corresponding protection path according to a required protection level.

10. The method as in claim 8, wherein the step of establishing the label switched path (LSP) through Generalized Multi-Protocol Label Switching (GMPLS) signaling further comprises: establishing a corresponding protection label switched path (LSP) according to a protection type.

11. The method as in claim 10, wherein the step of transferring the NGN service through the transportation connection further comprises:
- transferring the information of the label switched path (LSP) and the corresponding protection label switched path (LSP) to a service-layer control device.

12. The method as in claim 1, further comprising:
- when a fault occurs on the transport connection, switching the transport connection under the control of the transport-layer control device, and transferring switching result to the service-layer control device via the interface between the transport-layer control device and a service layer control device;
- managing the bandwidth resource and the QoS of the transport connection through the transport-layer control device.

13. The method as in claim 1, further comprising: establishing a service flow connection in the user plane of the service layer in NGN and implementing service-flow switching.

14. A system for implementing transport layer service of a Next Generation Network (NGN), the system comprising: a user plane, a control plane and a management plane of transport layer of the NGN, wherein
- the user plane comprises: a packet transport sub-layer and a physical transport sub-layer;
- the packet transport sub-layer comprises a Multi-Protocol Label Switch device, and is configured to establish a Label Switched Path (LSP) and to implement a packet switching function;
- the physical transport sub-layer comprises Synchronous Digital Hierarchy (SDH) devices and/or Optical Transport Network (OTN) devices, and is configured to establish a physical path for NGN service transport;
- the control plane comprises a transport-layer control device, and is configured to control the Multi-Protocol Label Switch device of the packet transport sub-layer to establish an LSP and a physical device of the physical transport sub-layer to establish a physical path, and to monitor and manage transport connection by cooperating with a service-layer control device in the control plane through an interface; and
- the management plane comprises management layer devices, and is configured to interact with the transport layer control device, controlling the transport layer control device to establish the transport connection.

15. The system as in claim 14, wherein the NGN transport layer network is isolated from the user plane of the NGN service layer network.

16. The system as in claim 14, wherein the packet transport sub-layer further comprises a Resilient Packet Ring (RPR) and/or a Multi-Protocol Label Switching (MPLS) Ring, and is configured to bear the packet service.

* * * * *